United States Patent
Hüsler et al.

(10) Patent No.: US 7,470,388 B2
(45) Date of Patent: Dec. 30, 2008

(54) METHOD FOR THE PRODUCTION OF STRUCTURAL COMPONENTS FROM FIBER-REINFORCED THERMOPLASTIC MATERIAL

(75) Inventors: Daniel Hüsler, Zürich (CH); Andreas Rüegg, Zürich (CH)

(73) Assignee: Weber Technology AG, Kuesnacht (CH)

( * ) Notice: Subject to any disclaimer, the term of this patent is extended or adjusted under 35 U.S.C. 154(b) by 546 days.

(21) Appl. No.: 10/527,954

(22) PCT Filed: Sep. 15, 2003

(86) PCT No.: PCT/CH03/00620

§ 371 (c)(1),
(2), (4) Date: Mar. 14, 2005

(87) PCT Pub. No.: WO2004/024426

PCT Pub. Date: Mar. 25, 2004

(65) Prior Publication Data

US 2005/0266224 A1 Dec. 1, 2005

(30) Foreign Application Priority Data

Sep. 15, 2002 (CH) .................................. 1566/02

(51) Int. Cl.
B29C 45/14 (2006.01)
(52) U.S. Cl. .................... 264/257; 264/259; 428/292.1; 428/294.1
(58) Field of Classification Search .................... None
See application file for complete search history.

(56) References Cited

U.S. PATENT DOCUMENTS

| | | | |
|---|---|---|---|
| 2,673,371 A | * | 3/1954 | Uhlig ......................... 264/237 |
| 4,517,136 A | | 5/1985 | Hemery |
| 4,573,707 A | | 3/1986 | Pabst |
| 4,652,171 A | | 3/1987 | Schutze |
| 5,704,644 A | | 1/1998 | Jaggi |
| 6,299,246 B1 | | 10/2001 | Tomka |
| 6,821,613 B1 | | 11/2004 | Kagi et al. |
| 6,854,791 B1 | | 2/2005 | Jaggi |
| 2006/0165955 A1 | | 7/2006 | Ruegg et al. |

FOREIGN PATENT DOCUMENTS

| WO | WO 90/06226 | 6/1990 |
|---|---|---|
| WO | WO 99/52703 | * 4/1999 |

* cited by examiner

Primary Examiner—Richard Crispino
Assistant Examiner—Barbara J. Musser
(74) Attorney, Agent, or Firm—Oppedahl Patent Law Firm LLC

(57) ABSTRACT

The method enables the series production of light structural components out of long-fiber thermoplastic material (LFT) with integrated continuous fiber (CF)-reinforcements in a single stage LFT-pressing step. In this, CF-tapes (5) are melted open and transferred into a profile tool (21) of a CF-profile forming station (20), there are pressed for a short time period and shaped into the required CF-profile (10). In doing so, by means of contact with the thermally conditioned profile tool (21) on the profile surface (11) a shock-cooled, dimensionally stable, thin casing layer (12) is formed and the inside of the CF-profile remains melted. Following a defined short shock-cooling period (ts), the CF-profile (10) is transferred into an LFT-tool (31) and pressed together with an introduced molten LFT-mass (6). In doing so, the casing layer (12) is melted open again on the surface (11) and is thermoplastically bonded together with the surrounding LFT-mass.

26 Claims, 11 Drawing Sheets

METHOD FOR THE PRODUCTION OF STRUCTURAL COMPONENTS FROM FIBER-REINFORCED THERMOPLASTIC MATERIAL

BACKGROUND

The invention is related to a method for the production of structural components from long fiber thermoplastic with integrated continuous fiber reinforcements as well as to an installation for the production of structural components of this kind. Known methods for the production of such structural components in most cases utilise plane continuous fiber reinforcements, e.g., in the form of semi-finished fabric products or with a sandwich structure, which, however, are very limited with respect to possible shaping and applications.

From international patent application publication WO99/52703 a method for the production of structural components is known, in the case of which molten continuous fiber strands are deposited on top of one another, so that they form a coherent load-bearing structure with plane joints and are pressed in a tool together with a forming mass reinforced with long fibers. Also these known processes, however, still manifest essential disadvantages with respect to efficient production, reproducibility and a defined development of an integrated continuous fiber load-bearing structure. In this manner it is not possible to produce a defined, single piece structural component, which can be made in a single press step and which comprises an integrated, precisely defined, optimally positioned and shaped, load-optimised continuous fiber reinforcing structure.

It would therefore be very desirable to overcome the disadvantages and limitations of the known production methods and to create a method for the efficient automatic production of structural components, which overcomes the disadvantages and limitations applicable up until now and to produce single piece components capable of being pressed in a single step and with an integrated, precisely defined, optimally positioned and three-dimensionally shaped reinforcing structure, which corresponds to the loads and forces to be absorbed.

SUMMARY OF THE INVENTION

According to the invention, a method for the production of structural components is disclosed, and by an installation for the production of structural components. By means of the defined, short shock-cooling with CF (continuous fiber)-profile shaping and the formation of a dimensionally stable casing layer a precisely defined shape and positioning of CF-profiles in the LFT (long fiber thermoplastic)—mass as well as an optimum bonding at the interface is achieved.

Also disclosed are advantageous further developments of the invention with particular advantages with respect to efficient cost-effective series production capable of being automated, with short cycle times as well as optimum alignment and forming of the continuous fiber reinforcing structures with improved mechanical characteristics. With this, it is possible to produce light structural components for a large number of applications, e.g., for means of transportation, vehicles and vehicle components with load-bearing functions and this in a simple and precise manner.

DESCRIPTION OF THE DRAWING

The invention will be described with respect to a drawing in several figures. What is shown is.

Where possible, like items among the various figures have been indicated with like reference designations.

DETAILED DESCRIPTION

Figure 1:
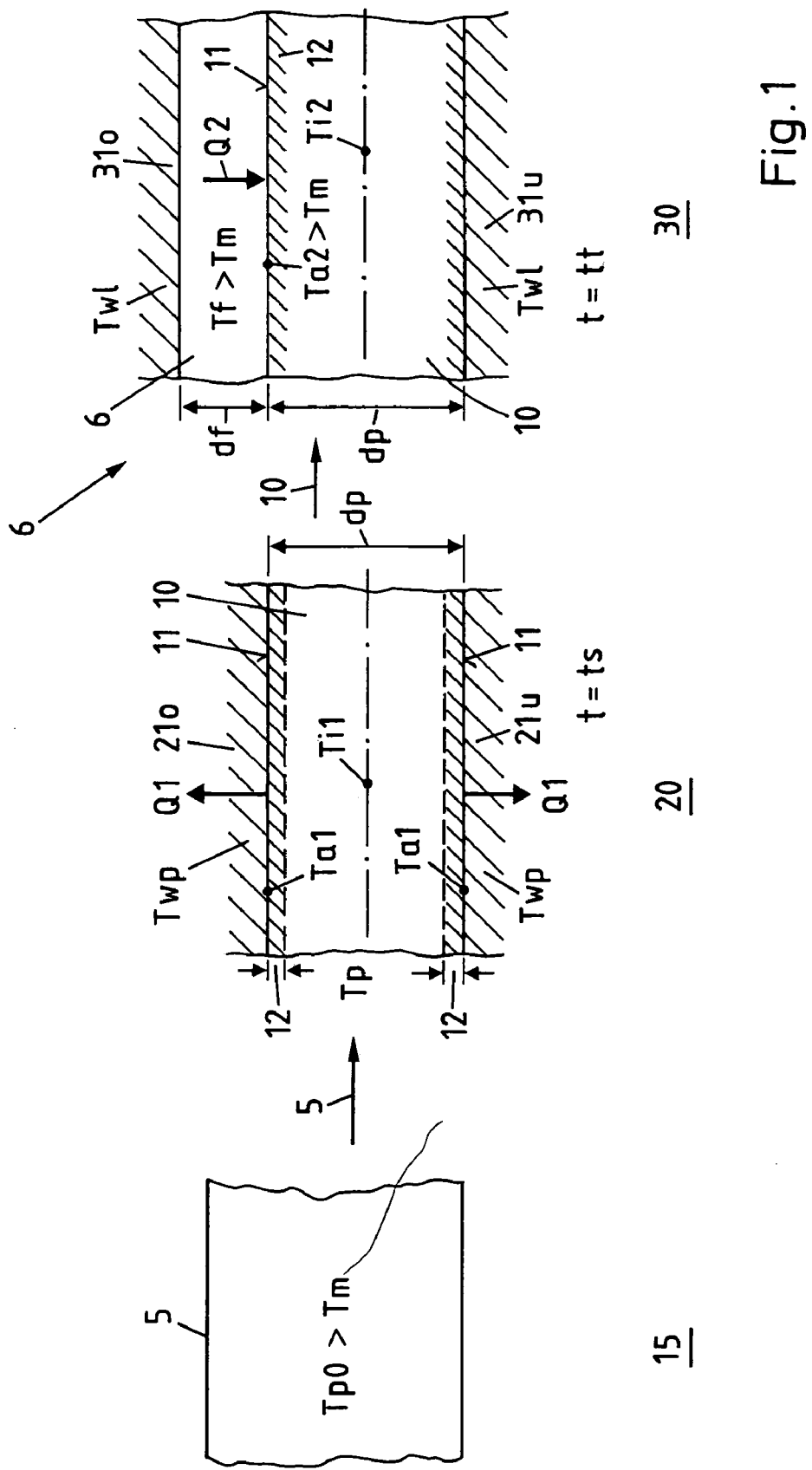
FIG. 1—schematically the method according to the invention with profile shaping and defined shock-cooling, FIG. 2—temperature dependence in a CF—profile during the shock-cooling for different shock-cooling periods, FIG. 3—temperature dependence in a CF—profile during the shock-cooling for different tool temperatures and heat transfers, FIG. 4—an example with the shock-cooling differing zone by zone on a CF—profile, FIG. 5a—the enthalpy as a function of the temperature during the heating-up and cooling-down of partially crystalline thermoplastics with a crystallisation hysteresis range, FIG. 5b—the temperature control on the surface during the shock-cooling in the enthalpy diagram, FIG. 5c—the temperature control in the lower layer during the shock-cooling in the enthalpy diagram, FIG. 6—the temperature distribution in the CF—profile following the shock-cooling, FIG. 7—the temperature distribution in the CF—profile and in the LFT—layer during the pressing in the LFT—tool, FIG. 8a—an arrangement of several CF-profiles in a structural component with a three-dimensional intersection point, FIG. 8b—the LFT—shaping of the structural component with integrated CF-profiles, FIG. 8c—a two-stage profile forming process, FIG. 9a, b—two different cross section shapes of a CF-profile at different places in a rib, FIG. 10—an inverse tempered CF-profile, FIG. 11—a CF-profile production line with a CF-profile—forming station, FIG. 12—an installation for the production of the structural components according to the invention with CF-profile forming station and LFT-press, FIG. 13—a positioning of CF-profiles on top and at the bottom in an LFT-pressing tool, FIG. 14—a structural component as a bumper beam support, and FIG. 15—a structural component as an assembly support (front end).

FIG. 1 schematically illustrates the method according to the invention for the production of structural components out of long-fiber thermoplastic material (LFT) with integrated continuous fiber (CF)-reinforcements in a single stage LFT-pressing process by means of shock-cooling and CF-profile compression moulding in its sequence.

In a heating station 15 impregnated, particularly, pre-consolidated CF-tapes or bands 5 are completely melted to a practically homogeneous temperature Tp0, which is selected to be well above the melting point Tm, and subsequently transferred into a two-part profile tool 21 (here in 21$u$ where "u" means "under") of a CF-profile forming station 20. Here the CF-tapes 5 with an input temperature Tp are formed into a chosen CF-profile 10 by means of pressing for a short time during a precisely defined shock-cooling period ts. During this form pressing and shock-cooling, a shock-cooled, dimensionally stable thin casing layer 12 is formed through the contact of the CF material with the thermally conditioned profile tool 21, namely, 21o ("over") and 21$u$ ("under"), with a defined, relatively low tool temperature Twp and through a high heat transfer Q1 from the hot CF-profile into the profile tool 21. As will be discussed in more detail below, the tool 21 has an ability to conduct a lot of heat away from the CF material very quickly, and this is advantageous for later method steps.

After a defined shock-cooling—and pressing period ts, the CF-profile 10 is immediately completely separated from the profile tool, transferred into an LFT-tool 31 (310 meaning "over", 31u meaning "under") of an LFT-press 30 and there positioned in a precisely defined manner in suitable shapings of the tool. Subsequently a molten LFT-mass 6 with a temperature Tf, which is situated above the melting point Tm, is introduced and put under pressure together with the CF-profile 10 and pressed, so that the casing layer 12 at the surface 11 of the CF-profiles is melted open again and is thermoplastically melted together with the introduced surrounding LFT-mass 6. In this way the newly introduced LFT material is able to form a very good bond with the outer layer of the CF material.

The structural components being combined in the previously mentioned step include at least one integrated, shock-cooled CF-profile. The temperature control during this process, i.e., the adjustment of the thermal and temporal parameters and of the shock-cooling period ts takes place in correspondence with requirements which will presently be discussed, which are capable of being achieved with the method according to the invention:

a—At the contact points of the CF-profile with a gripper for the transfer into the LFT-press 30, a non-sticking, solid profile surface is formed.

b—The dimensional stability of the CF-profiles 10 during the transfer into the LFT-press has to be sufficient, so that the CF-profiles are capable of being positioned in the LFT-tool precisely in the required position and shape.

c—The shape preservation of the CF-profile during the pressing with the LFT-mass 6 in the LFT-press is adjusted in such a manner, that following the pressing the required final shape of the CF-profile results in the component doing what is needed in each particular location. For example in some particular locations it will be desired that the CF-profile preserves its shape completely, while in other particular locations it will be desired that the CF-profile merges fully into the surrounding LFT-mass.

d—The interface joint at the contact surfaces 9 between the CF-profile and the surrounding LFT-mass has to achieve the required strength.

As will be discussed below, the method can be carried out so as to develop a thinner or thicker solidified casing layer 12.

Experience shows that as a general matter, the greater the shock-cooling, the greater the preservation of the shape (characteristics a, b, c) while with a lesser shock-cooling the shape change during the pressing is enhanced and the interface bonding (characteristic d) is strengthened at the beginning.

Figure 9A:
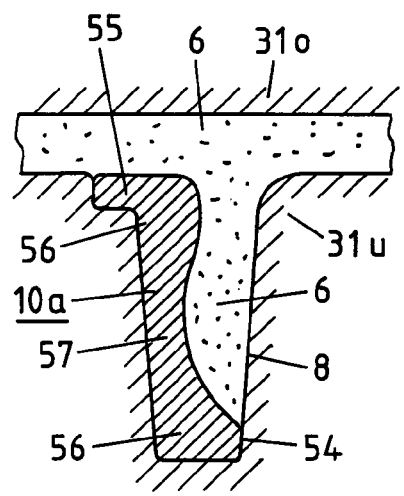

An example with a high degree of shape preservation is shown in FIG. 9a with a CF-profile in a rib. On one side of the CF-profile (adjacent to the lower LFT-tool 31u) a stronger shock-cooling with a stronger casing layer is able to take place, while on the opposite side of the CF-profile nonetheless a good interface bonding with the introduced surrounding LFT-mass 6 is achieved by means of a medium shock-cooling with a normally formed casing layer (on the side of the upper LFT-tool 310 of FIG. 1).

Figure 4:
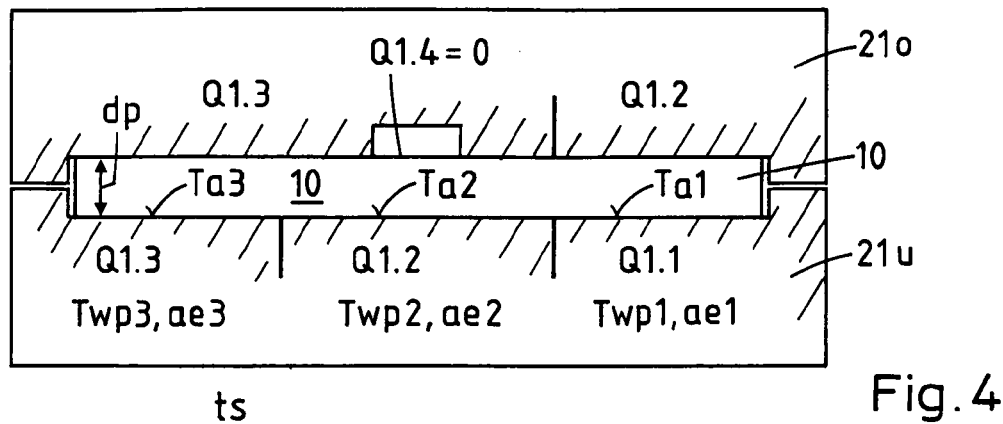

In general a surface 11 of the CF-profiles adjacent to the LFT-tool 31 is able to be previously strongly shock-cooled on one side (because it will not later be required to be bonded to the LFT-mass) and simultaneously the opposite side is able to be shock-cooled less strongly for the optimum bonding with the LFT-mass (refer to FIG. 4).

The optimum temperature control corresponding to the respective requirements of the CF-profiles (10) is achieved by a corresponding adjustment of the process parameters. These are:

Tp—the input temperature of the CF-profile prior to the shock-cooling, after the heating up to a homogeneous temperature Tp0 in the heating station 15.

During the shock-cooling:

ts—the shock-cooling period, i.e., the duration of the pressing and with this of the heat transfer Q1

Twp—the temperature of the profile tool 21 ae—the heat penetration coefficient during the contact with the tool 21; this is determined by the choice of material and the characteristics of the tool: specific heat c, thermal conductivity λ and specific density p. This results in ae=$(\lambda \cdot p \cdot C)^{1/2}$.

Q1—the heat transfer from the CF-profile 10 to the tool 21 is therefore given by Q1=f(ts, Tp−Twp, ae).

Ta, Ti—temperatures on the surface 11 of the surface or inside of the CF-profile tt—transfer time up to the contact of the CF-profile with the LFT-mass in the LFT-press.

Heat transfer during the LFT-pressing:

Tf—temperature of the introduced LFT-mass 6 prior to the pressing

Twl—temperature of the LFT-tool 31

Q2—the heat transfer from the hot LFT-mass 6 to the CF-profile 10 here results as a function f(Q1, Ta, Ti, Tf, Twl).

During the adjustment of these parameters, also the thickness dp of the CF-profiles and the materials characteristics are included. The thickness dp, for example, may be between 2 and 5 mm.

Figure 2:
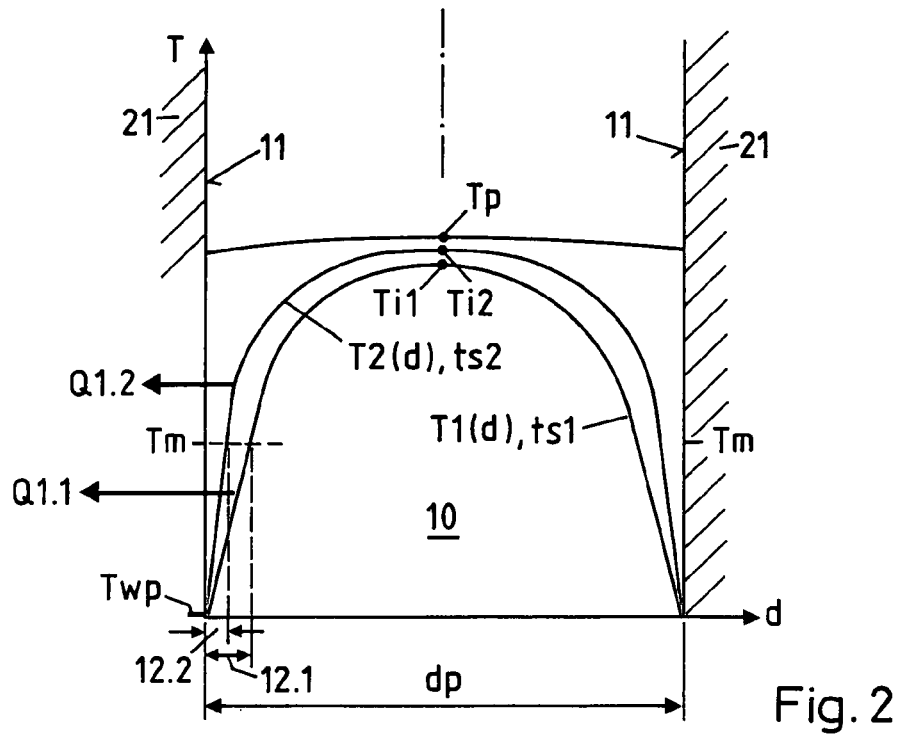

FIGS. 2, 3, 6, and 7 each portray a physical distribution of temperatures. In each figure, one or more graphed lines will each depict temperature as a function of position for a particular time. For example, in FIG. 2, there is a mass of material 10 between two tool surfaces 11. The two surfaces to the left and right of FIG. 2 may, for example, be the surfaces 11 at the top and bottom of the center region 20 in FIG. 1. In FIG. 2, a top curve containing point Tp represents a temperature distribution as a function of position when the material 10 has first been introduced and before very much heat has been conducted away from the material 10. In FIG. 2, the next curve downwards contains a point Ti2 and portrays a temperature distribution as a function of position after an amount of heat Q1.2 has been extracted from the mass of material 10. In this same figure, the next curve downwards contains a point Ti1 and portrays a temperature distribution as a function of position after an amount of heat Q1.1 has been extracted from the mass of material 10.

Figure 3:
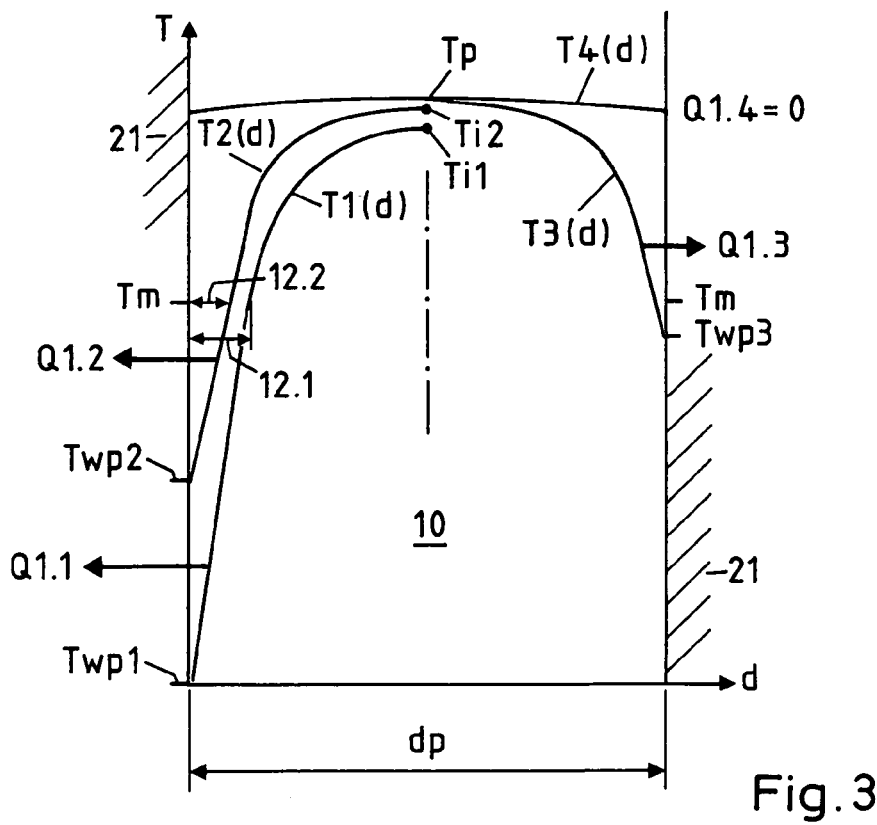

FIGS. 2, 3 schematically illustrate different settings of the shock-cooling parameters. They illustrate temperature dependences in a CF-profile T(d) over the layer thickness dp after a shock-cooling carried out at the time t=ts.

FIG. 2 illustrates two temperature dependences T1(d), T2(d) for two different shock-cooling periods ts1, ts2, with the same tool temperature Twp. The longer shock-cooling period ts1 with a heat transfer Q1.1 results in a correspondingly stronger, thicker casing layer 12.1 (solidified below the melting temperature Tm) and the shorter shock-cooling period ts2 with a lesser heat transfer Q1.2 results in a thinner casing layer 12.2.

FIG. 3 illustrates different temperature dependences T(d) with a constant shock-cooling period ts, however, with different tool temperatures Twp1, Twp2, Twp3 with corresponding heat transfers Q and the resulting casing layers 12, wherein the intensity of the shock-cooling decreases from T1 to T4 (refer to FIG. 4):

T1: Twp1=strong shock-cooling Q1.1 and casing layer 12.1

T2: Twp2=medium shock-cooling Q1.2 and casing layer 12.2

T3: Twp3=weak shock-cooling Q1.3 and casing layer 12.3

T4: no contact with the tool (open points, recesses, FIG. 4), Q1.4=0, i.e., no thermal transfer.

In this, the surface temperatures Ta of the CF-profile correspond to the tool temperatures Twp and the temperatures inside the profile Ti are situated in the vicinity of the input temperature Tp of the heated CF-tape. It is thought preferable to use short shock-cooling periods ts and low tool temperatures.

The shock-cooling periods ts are preferably between 1 and 5 sec., and are more preferably approximately 2-4 sec., although in special cases also longer times, e.g., of up to 10 sec. would be possible. The transfer times tt in the LFT-press amount to, e.g., between 5 and 20 sec.

By means of the adjustment of the parameters, and by controlling temperatures, the shock-cooling is correspondingly adjusted to the respective requirements in order to:

achieve the optimum dimensional stability for the handling of the CF-profiles and for the required final shape of the profile after the pressing operation and achieve an optimum bonding between the CF-profile and the LFT-mass (bond strength).

Differing requirements in certain zones, however, may be demanded of a CF-profile (with respect to the criteria a, b, c, d mentioned above), for example because of the intended function of the respective part or of the side or of the zone of a CF-profile. For example, with a CF-profile of FIG. 9a or in the case of a component of FIG. 8, it is necessary to take into account the intended zones of force transfers and force introductions.

It is a very important advantage of the shock-cooling and profile shaping according to the invention, that the shock-cooling on the EP-profiles is capable of being adjusted on a zone-by-zone basis differently and respectively for each zone. FIG. 4 shows how this may be adjusted on a zone-by-zone basis. FIG. 4 schematically illustrates different zones with differing shock-cooling in each of the zones, with the zones distributed longitudinally on a CF-profile 10. In this example, each of zones Q1.1 to Q1.4 has its own amount of shock-cooling, in analogy to the example of FIG. 3. In doing so, these differing zones on the profile tool 21 may comprise differing temperatures Twp1, Twp2, Twp3 as well as also differing material characteristics ae1, ae2, ae3. As illustrated in FIG. 4, each side of the EP-profile (over and under) is also capable of being differently shock-cooled with the corresponding profile tool parts 21o and 21u. The desired extent of shock cooling for each zone on the tool 21 is capable of being achieved by thermal conditioning (heating, cooling) and the tool temperature Twp as well as by the material characteristics ae, i.e., metallic materials and possibly local insulating coatings.

It is instructive to discuss exemplary materials for use with the method according to the invention. The LFT-mass 6 preferably comprises an average fiber length of at least 3 mm. Even better mechanical properties are achieved with greater fiber lengths of, e.g., 5-15 mm. The continuous fiber reinforcement (CF) may consist of glass-, carbon- or aramide fibers, and for the highest compressive strength boron or steel fibers may be employed.

The CF-profiles may mainly be built-up of UD (unidirectional)-layers (0°) or continuous fiber strands of different kinds. It is also possible to use layers with differing fiber orientations, for example alternating layers of 0°/90° or 0°/+ 45°/−45° fiber orientations. The CF-profiles may also comprise a thin surface layer (e.g., 0.1-0.2 mm) made of pure thermoplastic material without any CF-fiber reinforcement.

The shock-cooling method according to the invention is particularly suitable for crystalline materials, because it is possible to exploit crystallisation characteristics of the materials. Especially suitable for structural components are crystalline, or more particularly partially crystalline polymers as the matrix of the CF-profiles 10 and of the LF-mass 6, because such polymers are capable of achieving higher compressive strengths. It is also possible, however, to utilise amorphous polymers such as ABS or PC. The crystalline thermoplastic material may, for example, consist of polypropylene (PP), polyethylene-therephthalate (PET), polybutylene-therephthalate (PBT) or polyamide (PA). In the discussion that follows, the crystalline behavior and the shock-cooling are further explained on the assumption that polypropylene PP is employed.

Figure 5A:
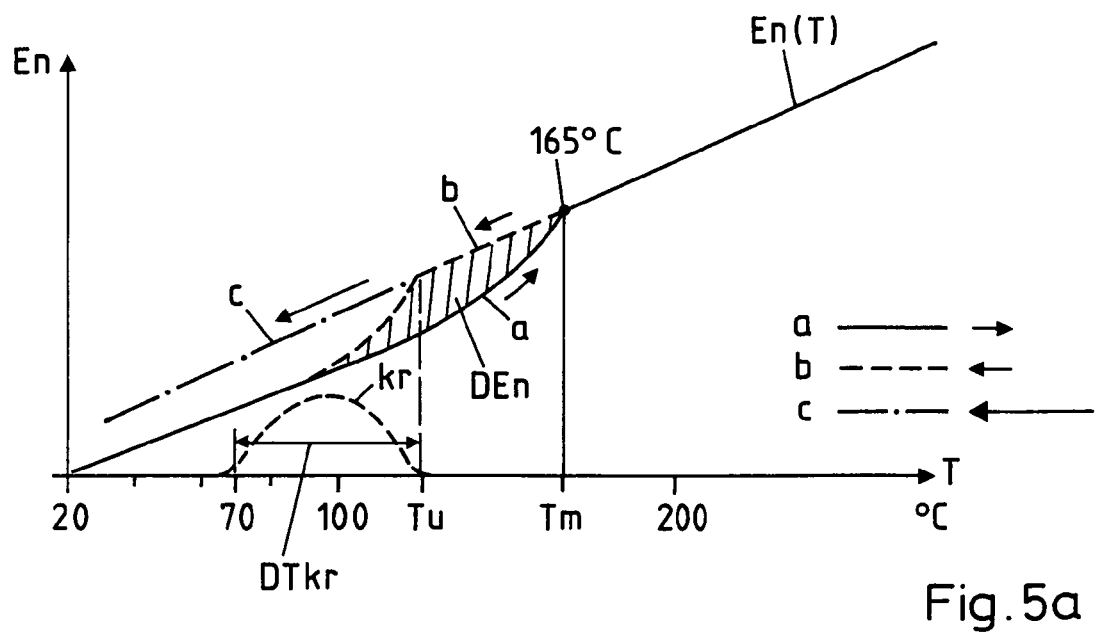

To this end, FIG. 5a shows the enthalpy of polypropylene (PP) as a function En(T) of the temperature. Curve a shows the enthalpy of the PP during melting or heating-up. During melting, the temperature starts at a value that is lower than the melting point Tm (approximately 165° C.). As may be seen from curve a, the enthalpy increases strongly as the temperature rises and moves toward the melting point Tm (or stated differently the slope of curve a is relatively high). The great increase in enthalpy (that is, the high slope of the curve) as a result of the melting of the crystalline zones. Stated differently, it takes quite a bit of added heat to melt the crystalline zones of the material. If we assume that the next temperature change is a slow cooling-down, then the material follows curve b, in which the polymer remains amorphously molten down to a lower solidification temperature Tu of approx. 125° C. Only as the temperature continues to decline below Tu does enthalpy strongly decline. This range of temperatures is called the range of crystal growth DTkr. In the case of PP this range is approximately 70-125° C., and the amount of crystal growth is shown by the curve kr). Between curves a and b in the figure is a hysteresis area DEn, which corresponds to the latent heat of the crystallisation.

Importantly, it can be appreciated from FIG. 5a what happens if a cooling-down is forced upon the PP so quickly that crystallization is unable to occur. The straight line c shows the path, downwards and to the left, corresponding to a shock-like rapid cooling-down. When this happens the polymer, which was amorphous above the temperature Tu, remains amorphous also below the temperature Tu, yet it changes its state from liquid to solid. Such an amorphous solid can be heated up again in a way which follows the straight line c upwards and to the right. If we compare the amount of heat that needs to be added to bring about a particular temperature change (for example from below Tu to above Tm) for this amorphous material as compared with crystalline material, it can be seen that less heat is needed to bring about this temperature change if the starting material is the amorphous material. The reason for this is of course that the amorphous material contains the latent energy Den. This permits a very rapid heating-up corresponding to the straight line c.

In the method according to the invention can be carried out by means of the following process steps S1-S4:

S1—Shock-cooling (ts)

S2—Transfer into the LFT-press (tt)

S3—Initial heating-up again of the profile surface layer (11) during the LFT-pressing and S4—subsequent cooling-down during the LFT-pressing (S4.1) and after the pressing (S4.2).

Figure 5B:
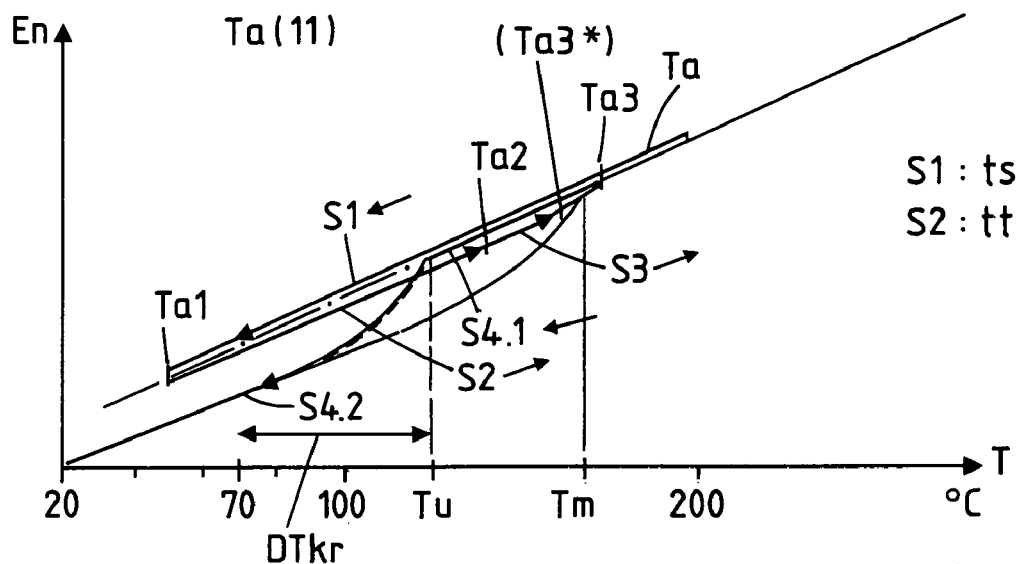
Figure 5C:
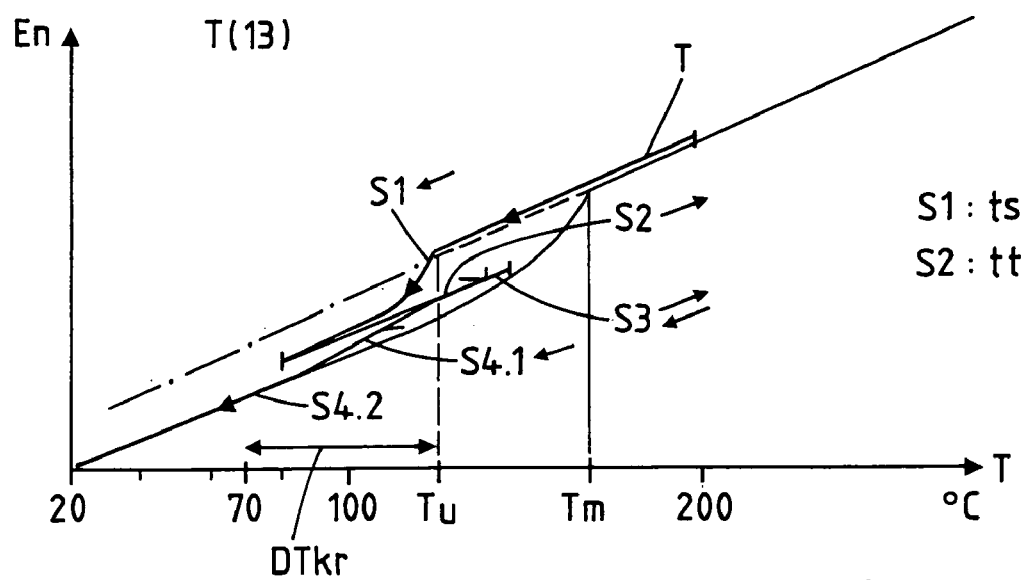
Figure 6:
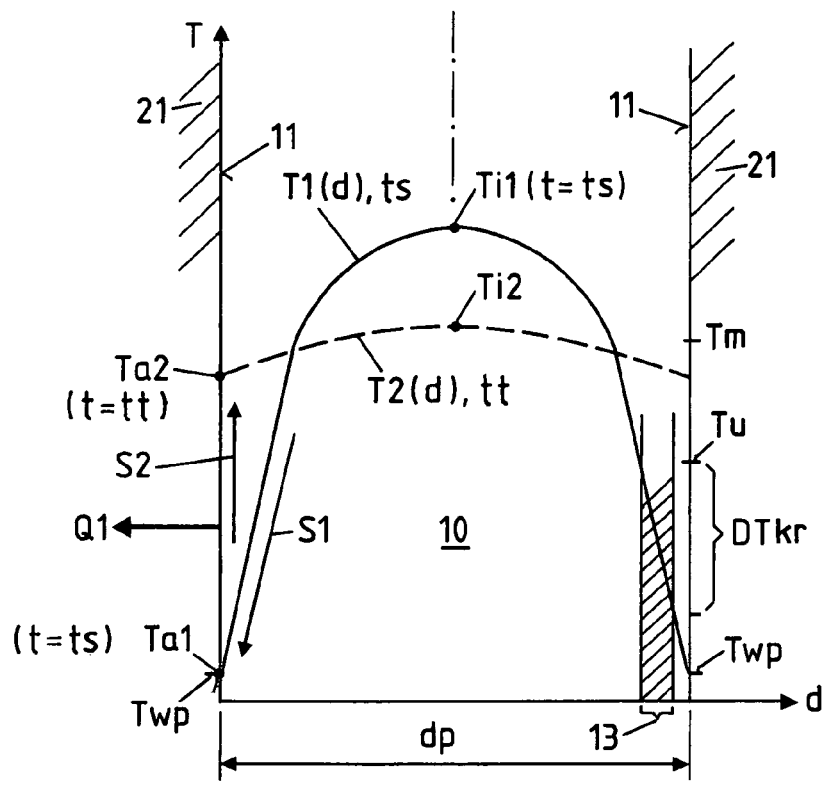
Figure 7:
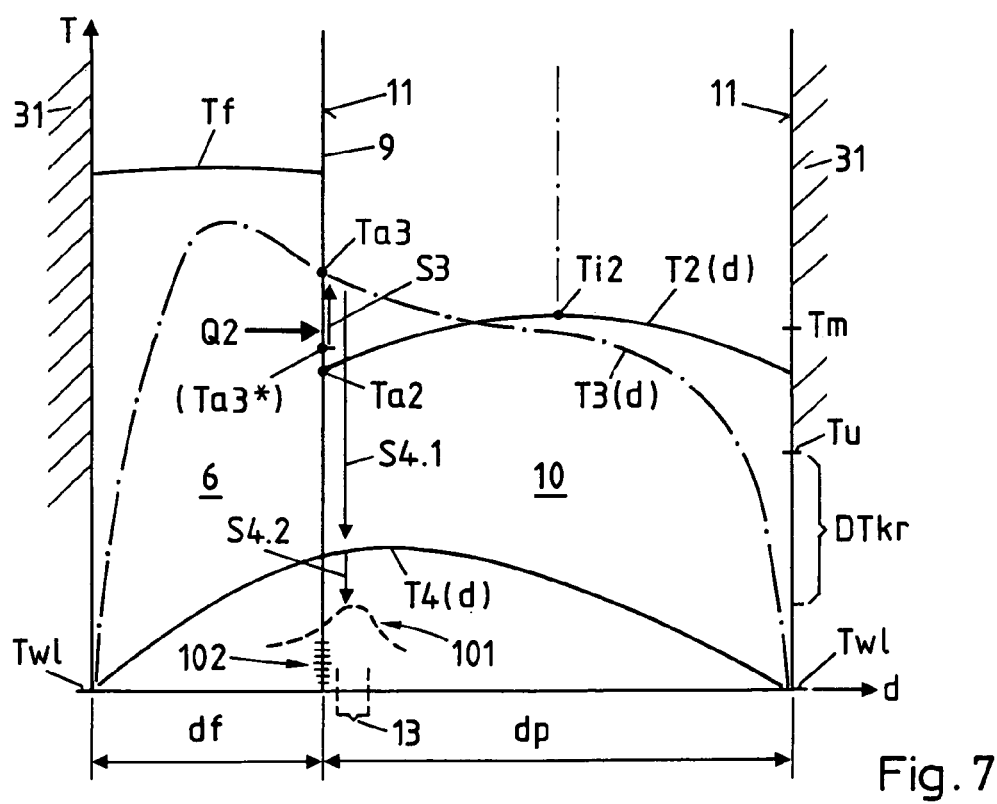

These process steps are further explained in conjunction with the FIGS. 5b, 5c, 6 and 7. FIGS. 5b and 5c illustrate the temperature control on the surface 11 and in lower a layer 13 below surface 11. FIGS. 6 and 7 illustrate the temperature dependence T(d) in the CF-profile 10, particularly in the CF-profile and in the LFT-mass 6 during pressing.

FIG. 5b illustrates a temperature control on the surface 11, and in particular in a surface layer Ta(11) during the shock-cooling in the enthalpy diagram, this in conjunction with FIGS. 6 and 7. During the shock-cooling the surface 11 of the profile within the shock-cooling period ts is very rapidly lowered down to the temperature Ta1 (step S1). Subsequently, during the transfer time tt a temperature equalisation with a rapid rise again of the surface temperature to a temperature Ta2 takes place (step S2), which is situated clearly below the melting point Tm. During the subsequent pressing with the liquid LFT-mass 6, the profile surface 11 is initially heated-up again to a temperature Ta3 (step S3), which is situated above the melting point Tm, and in doing so is completely melted together with the LFT-mass. Subsequently in the step S4 a slow cooling-down takes place, initially still during the pressing (S4.1) and thereafter following the removal from the LFT-press (S4.2), wherein a further crystallisation takes place in the temperature range DTkr. A sufficiently good interface bonding and melting together CF-LFT, however, is capable of being achieved also with a stronger shock-cooling with a lower surface temperature Ta3* (after step S3), which is situated clearly above Tu, but slightly below Tm.

FIG. 5c illustrates the temperature control, and in particular the temperature curve T(13) in a lower layer 13 below the surface 11 of the CF-profiles (e.g., at a depth of 0.1-0.4 mm), in which a high crystallisation is produced by slow temperature control in the crystallisation temperature range DTkr for an enhanced form stability. During the shock-cooling (S1) a strong crystallisation takes place in the lower layer 13. During the temperature equalisation (step S2) in the transfer time tt and initially also during the pressing (S3), a heating-up takes place, wherein the temperature, however, is kept below the melting temperature Tm, in order that the crystallisation remains preserved. These temperature changes in the layer lower 13 take place more slowly than on the surface (FIG. 5b).

During the cooling-down (S4) a further crystallisation takes place. The transfer, positioning and pressing are carried out in such a way as to give rise to a stronger or weaker formation of this crystallised zone in the layer lower 13, thereby providing a desired degree of dimensional stability.

FIG. 6 illustrates the temperature gradient T1(d) with a surface temperature Ta1 in the CF-profile 10 following the shock-cooling at the point in time t=ts (step S1). Following the transfer into the LFT-press (step S2), rapidly a balanced temperature distribution T2(d) with a reached surface temperature Ta2 is achieved after a transfer time t=tt. The crystallisation temperature range DTkr (approx. 70-125° C.), in which the crystal growth takes place (kr in FIG. 5a), is also indicated.

FIG. 7 illustrates the temperature gradient in the CF-profile 10 and in the adjacent LFT-layer 6 (with a thickness df) during the pressing operation in the LFT-press. With the pressing, first the quantity of heat Q2 is transferred from the hot LFT-layer 6 with a temperature Tf to the CF-profile 10 (step S3). In doing so, a temperature distribution T3(d) is produced, wherein the temperature Ta3 on the profile surface 11 and at the interface 9 rapidly increases strongly and with this a high-quality melting together is achieved, together with a high bonding strength. Subsequently the temperature T4(d) in step S4 drops once again in correspondence with the LFT-tool temperature Twl. During the pressing together of CF-profiles 10 with the LFT-mass 6 and the subsequent cooling-down initially in the LFT-tool (S4.1) and then following the removal (S4.2), the temperature control can be selected in such a manner that the crystalline proportion (at the required position) is increased by means of a correspondingly slower transition through the crystal growth temperature range DTkr.

In analogy to the differing thermal conditioning by zone in the profile tool 21, the LFT-tool 31 may also comprise differing thermal conditionings, that is to say differing heat transfers by zone, by means of differing parameters: tool temperatures Twl and heat penetration coefficients ae in different zones of the LFT-tool.

Following the removal from the LFT-tool and after the cooling-down of the structural components, it is possible that slight shape changes occur, as a result of differing expansion coefficients of CF-profiles and LFT-mass and also of material contraction. These shape changes can be influenced and indeed can be compensated for, by means of a different temperature control during cooling-down in some places, by analogous thermal secondary treatment, or also by a corresponding shaping of the tools, which compensates the shape change (typically by pre-forming in the opposite direction).

In the case of partially crystalline polymers such as PP it is possible to select the temperature control in such a manner that the crystallisation characteristics are exploited for the improvement of non-deformability and bonding strength. For example:

in casing layer 12, and in particular in the layer lower 13, it is possible to increase the strength of the casing zone in the crystallisation temperature range DTkr;

on the profile surface 11 a minimum crystal growth can be achieved, if the surface temperature Ta in step S1 and step S2 is very rapidly brought through the crystal growth temperature range DTkr and the profile surface during the pressing is rapidly and as completely as possible melted open and bonded with the LFT-mass (by Q2);

the shape stability is increased by a greater crystalline proportion in the casing layer, particularly in the lower layer 13; and depending on the required further shapability during the LFT-pressing, a smaller or greater crystalline proportion is produced in the casing layer, particularly in the lower layer 13.

A temperature gradient at the interface 9 at the contact surface CF-LFT is capable of further increasing the strength of the joint CF-LFT by means of a directed crystal growth over the interface.

Figure 8A:
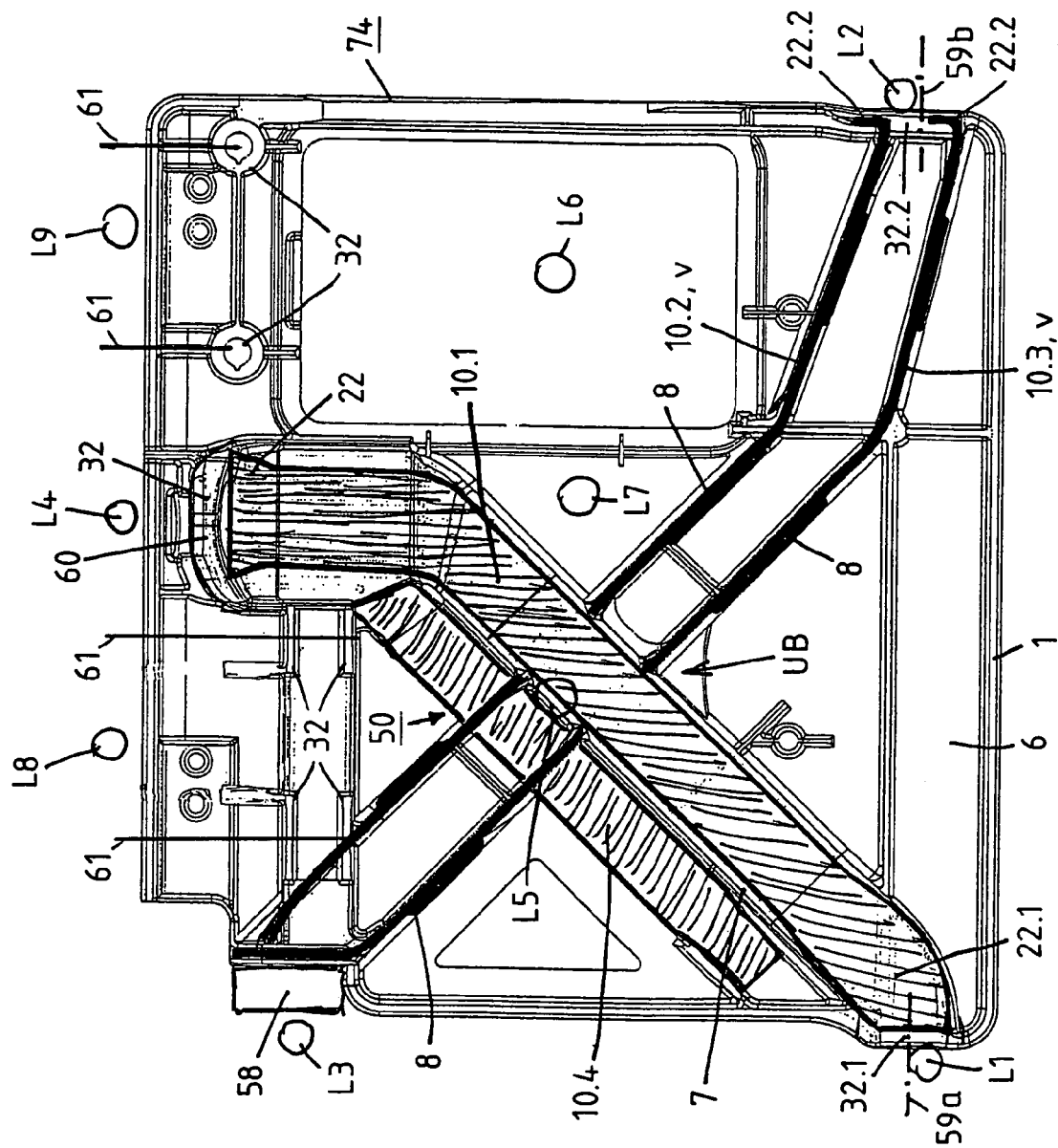
Figure 8B:
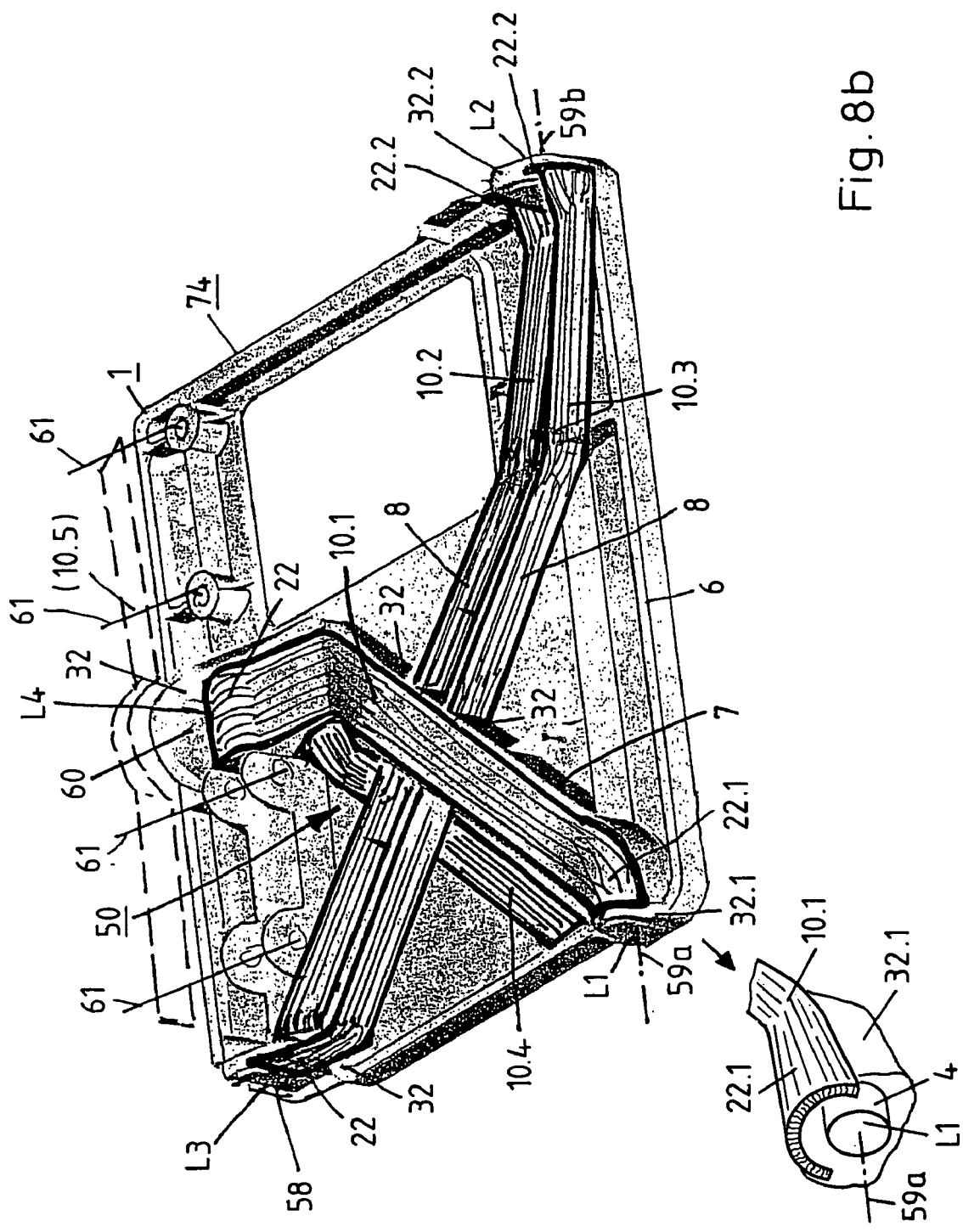
Figure 8C:
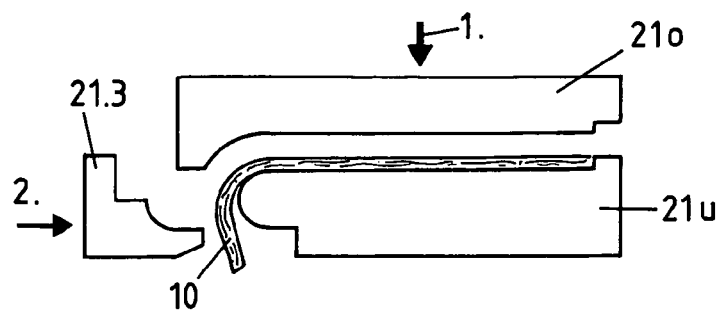

FIGS. 8a, 8b, 8c illustrate possible shapings of the CF-profiles in correspondence with the differing functions and requirements at different points of a certain CF-profile, for example for use in a structural component so as to absorb external loads. For this purpose, the CF-profiles may comprise a three-dimensional profile shaping, which is integrated into the structural component in a precisely defined position. They may comprise bends, twists or folds in longitudinal direction and they may comprise special shapings 22 for force transfers to the LFT-mass and for the direct absorption of external loads, particularly for the receiving of inserts 4 (mounting parts), at which external loads are introduced into the component. The shaping of the surrounding LFT-mass 6 is also selected to match the shaping of the CF-profiles 10. Shapings of force transfer points (of forces and moments) inside a component (e.g., of a CF-profile through the LFT-mass on to other CF-profiles) are able to be formed both as shapings 22 of the CF-profiles as well as shapings 32 of the LFT-mass.

To maximize strength and rigidity, it is desirable to avoid abrupt transitions between the CF-profiles and the LFT-mass and instead to employ continuous transitions therebetween.

Figure 11:
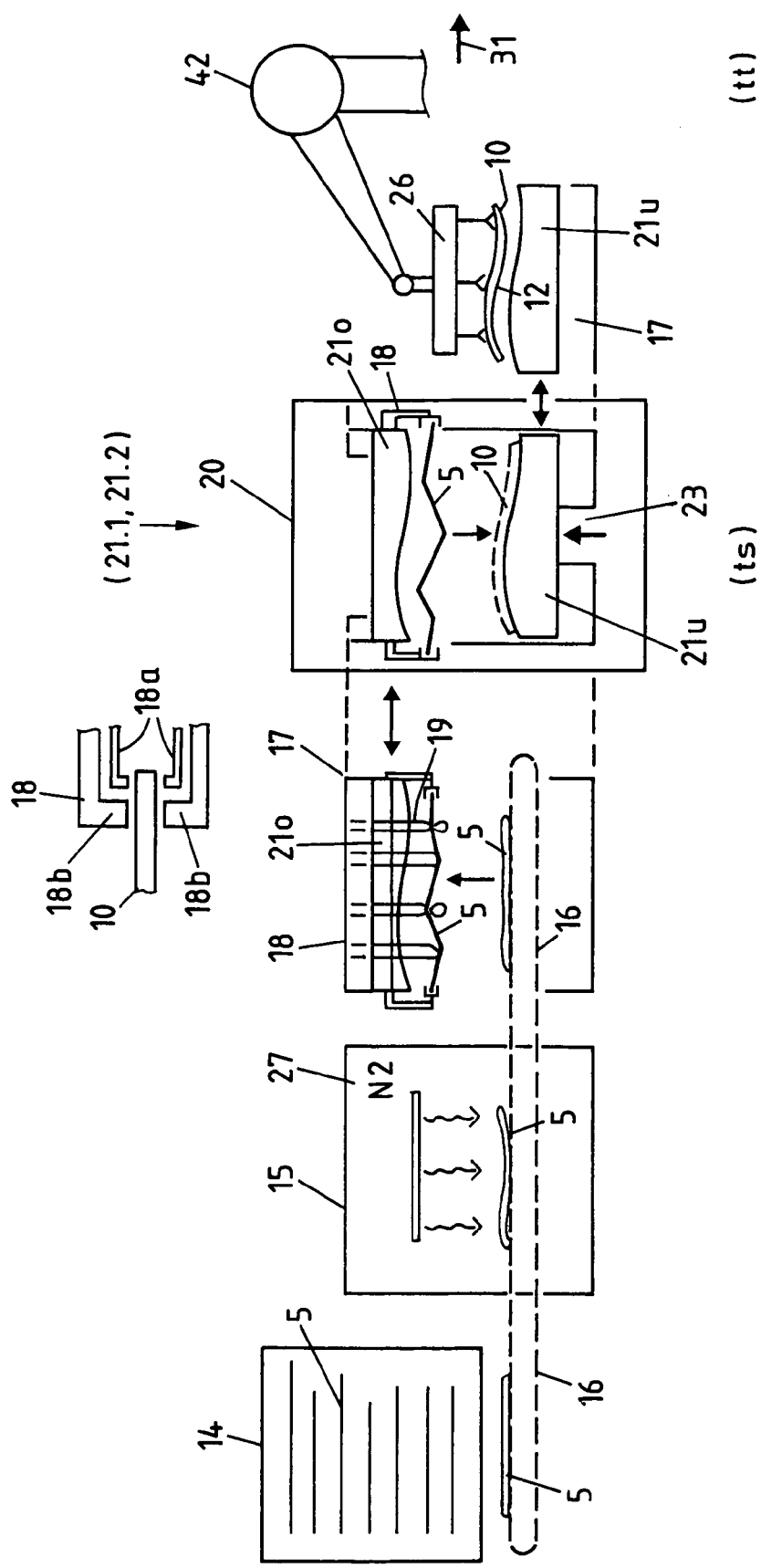

The three-dimensional shaping of the CF-profiles is implemented, for example, by a pre-forming of the molten CF-tapes 5 in the horizontal plane by the tape gripper 18 and by pre-forming elements 19 during the transfer into the CF-profile forming station 20 (refer to FIG. 11). In doing so, the CF-tapes 5 may also be twisted. Subsequently the shaping also takes place in the third dimension (vertically) by the profile tool 21, so that to a great extent any required three-dimensionally shaped CF-profiles can be produced.

FIGS. 8_a_, _b_ illustrate the example of a complex structural component in the form of a ⅔ rear seat back 74 with a central seat belt connection 60 for the middle seat of a vehicle with several demanding load introductions for different load cases (crash loads). FIG. 8_a_ in plan projection illustrates the arrangement of the CF-profiles in the component and FIG. 8_b_ in a perspective view the LFT-mass 6 and drawn in it the integrated CF-profiles 10.1 to 10.4. This example illustrates the load-optimised shaping of the CF-profiles themselves as well as the load-optimised arrangement in a precisely defined position in the component to form a structure with a corresponding shaping of the LFT-mass 6 and with an optimum bonding strength between the CF-profiles carrying the main loads (with directed continuous fibers) and the complementing LFT-mass (with undirected long fibers).

Here four main load carrying points L1 to L4 result from:

the loads L1, L2 on the axle holders 59_a_, 59_b_, around which the rear seat back is able to be swivelled, the load L3 on the lock 58, for fixing the rear seat back in its normal position and the load L4 on the belt lock, resp., belt roller 60 for the central belt of the middle seat.

With this structural component the following load cases (with the further loads L5 to L9) are covered:

Front- and Rear Collision

Securing of Any Goods Loaded

Belt Anchoring

Head support anchoring.

For the receiving and transferring of all loads and forces the intersecting CF-profiles together with the joining force-transmitting shapings of the LFT-mass form a spatial, three-dimensional intersection structure 50. Here the CF-profiles respectively in pairs in the LFT-shapings form a moment-transmitting girder subject to bending:

The CF-profiles 10.1 and 10.4 in a crimp 7 of the LFT-mass form a girder subject to bending between the loads L1 and L4 and the CF-profiles 10.2 and 10.3 in the ribs 8 of the LFT-mass a girder subject to bending between the loads L2 and L3.

Through the three-dimensional intersection point 50, in this the load L4 on the belt roller and also in part other loads, which act on the girder subject to bending 10.1/10.4, is also supported on the other girder subject to bending 10.2/10.3 (and vice-versa).

The main forces, resp., loads L1 to L4 are received by means of force introduction points:

through shapings 22 and 32 of the CF-profile ends and of the LFT-mass for receiving the external forces with or without inserts 4.

In doing so, the inserts 4 prior to the pressing operation are able to be inserted into the LFT-tool and then pressed together with the CF-profiles and the LFT mass or else it is also possible to fit them into the component later on.

Here the CF-profile 10.1 comprises an arc-shaped widening 22.1 for receiving an insert 4 at the axle bearing 59_a_. The other axle holder receptacle 59_b_ is formed by shapings 22.2 of the CF-profiles 10.2 and 10.3 and by adapted joining shapings 32.2 of the LFT-mass. These profile ends 22.2 are bent over and in this manner anchored in the LFT-mass for the purpose of increasing the tensile strength. The lock 58 is bolted on to a lock plate on the CF-profile 10.3 and supported by the CF-profile 10.2. The belt roller 60 is supported by shapings 22 of the CF-profiles 10.1 and 10.4 and by LFT-shapings 32.

The smaller loads L8, L9 of head supports 61 here are absorbed through LFT-shapings 32. For reinforcement, however, it would also be possible to integrate an additional CF-profile 10.5 deposited transversely (in some zones oriented flat or vertically).

In this example the three-dimensional profile shaping is evident in many variants.

The depositing sequence of the CF-profiles into the LFT-tool is:

first the CF-profile 10.1, thereupon the CF-profiles 10.2 and 10.3 and subsequently the CF-profile 10.4. Then the liquid LFT-mass 6 is introduced and the complete component pressed in a single step as a single piece and as a single shell. In order to obtain as short as possible transfer times tt, several or all CF-profiles (10.1-10.4) are able to be gripped with a multiple gripper 26 or robot, pre-positioned correctly relative to one another during the transfer and be inserted into the LFT-tool 31 together in a single step.

During the form pressing of the CF-profiles it is also possible to press several profiles in one profile tool 21 with a profile forming station, e.g., here the CF-profiles 10.2 and 10.3.

The profile shaping in the CF-profile forming station 20 in case of particularly complicated shapes may also be carried out by means of a multipart profile tool in a multi-stage shaping process. An example for this is illustrated in FIG. 8_c_ with a three-part tool 21_u_, 21_o_ and 21.3. In a two-stage shaping process, here first the tool parts 21_o_ and 21_u_ are closed and thereupon immediately on the side the tool part 21.3. In this manner it is possible to shape a 90° or 180°-arc—e.g., for zones, where forces are to be introduced.

FIGS. 9_a_, 9_b_ illustrate an example of a CF-profile 10, which over its length comprises differing cross-sectional shapes, this in adaptation to the forces to be transmitted and for the optimum bonding with the LFT-mass 6. The Figures in cross-sectional view illustrate a CF-profile 10_a_, 10_b_ in a rib 8, e.g., corresponding to the profiles 10.2 or 10.3 of FIG. 8, at two different locations.

FIG. 9_a_ illustrates a shaping 10_a_ with a positioning shoulder 55 for fixing and holding the CF-profile in the required position—this especially during pressing, when the liquid LFT-mass is pressed into the rib. On top and underneath the CF-profile respectively comprises a thicker zone 56 as tensile—and compressive zones (in longitudinal fiber direction) for the transmission of moments. Located in between is a thinner thrust zone 57 with a correspondingly thicker adjacent LFT-layer 6 and with a large bonding surface area and a particularly strong interface joint.

With this, the shear resistance is increased by the adjacent LFT-layer 6 with isotropic fiber distribution (while the strength transverse to the fiber orientation in the CF-profiles 10 here is lower).

Figure 9B:
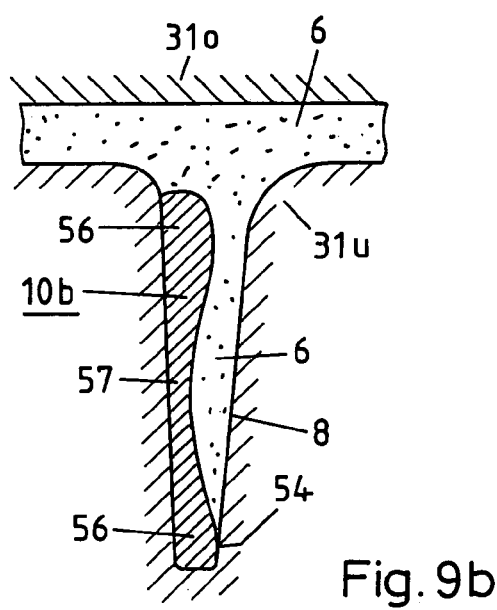

At another location according to FIG. 9b the profile cross-section 10b is changed corresponding to the force situation there: stretched, i.e., higher and narrower and without a positioning shoulder.

For the secure and accurate positioning and fixing of the CF-profiles, during the pressing with the LFT-mass, further positioning points 54 may be developed on the CF-profiles, which correspond to the shaping of the LFT-tool 31o (top) and 31u (bottom). Here the positioning point 54 serves for the accurate positioning below in the rib 8. Positioning points can also be arranged suitably distributed in the longitudinal direction of the CF-profiles.

In an analogous manner, profile shapes of this kind may also be positioned and fixed on crimped walls instead of in ribs 8.

Instead of the examples 8a, 9a, it is also possible to design the cross-sections of CF-profiles as "L"- or "Z"-shaped, depending on the application.

Figure 10:
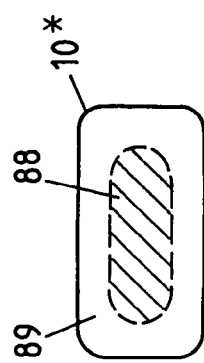

In addition to the shock-cooled CF-profiles, further shaped CF-profiles, which, however, have been treated separately and in a thermally inverse manner (i.e., solid inside, liquid outside), may be brought into the LFT-tool for the non-deformable transfer and pressed together with the shock-cooled CF-profiles in a single step. As an example, the CF-profile 10* according to FIG. 10 as a result of external heating-up is capable of comprising a molten external zone 89 and a still non-deformable cooler internal zone 88. For the handling and transfer, this CF-profile 10* may be gripped by means of cold grippers at non-sticking contact points (which are thereby cooled) for a short period.

Figure 12:
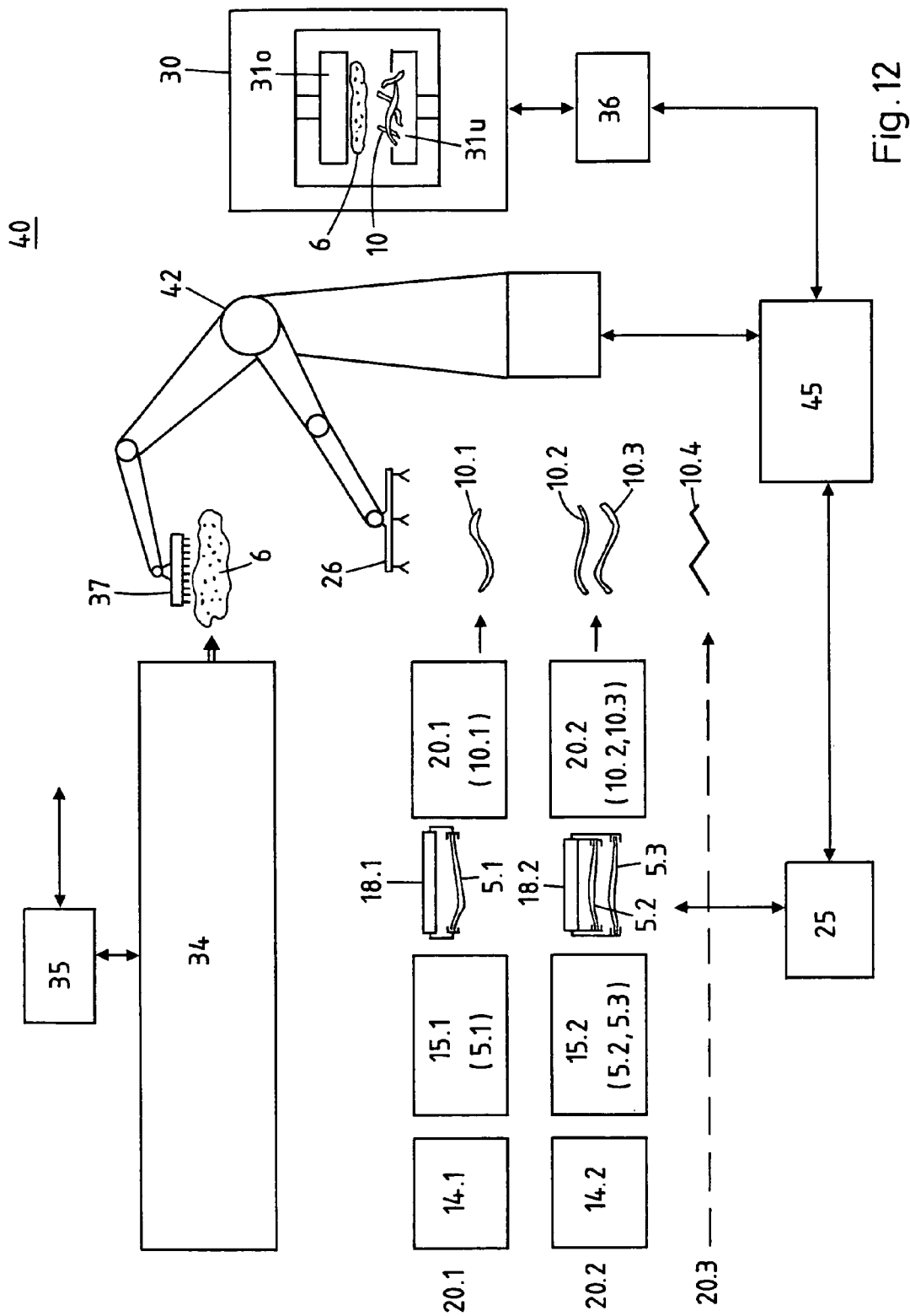

FIGS. 11 and 12 illustrate examples of a CF-profile production line, and in particular of an installation for the implementation of the method according to the invention. FIG. 11 depicts an example of a CF-profile production line with a CF-profile forming station 20, with a semi-finished products store 14, a heating station 15, with a protection gas atmosphere 27 (e.g., with N2, for critical materials and temperatures), with a conveyor belt or a chain conveyor 16 (e.g., a studded chain with a non-sticking coating and a brush cleaning system), a band gripper 18 with pre-forming elements 19, which are attached to the upper CF-profile tool 21o, a CF-profile forming station 20 with shock-cooling, with a transfer portal 17 for the upper tool part 21O and with a CF-profile press 23. With a profile gripper 26 and a transfer robot, particularly a handling unit 42, the produced CF-profiles are transferred into the tool 31 of an LFT-press 30 and accurately positioned. From the semi-finished products store 14, the CF-tapes 5 having been cut to a suitable size (also with varying length, width and thickness) are brought to the heating station 15 with the chain conveyor 16 and there, e.g., with IR-radiators are completely melted open and heated-up to a homogeneous required tape temperature Tp0. Subsequently the molten CF-tapes 5 are gripped with a band gripper 18 with pre-forming elements 19, which are attached to the upper tool part 21o, and during the transfer into the CF-profile forming station 20 are pre-formed (pre-formed in the horizontal plane, e.g., by means of positioning pins with bending or rotation of the molten tape), moved over the lower profile forming tool 21u with the transfer portal 17, deposited there in the required pre-formed position and immediately pressed in the precisely defined, adjustable shock-cooling period ts for the formation of the dimensionally stable casing layer 12. By means of the deformation in the profile tool, the required, defined three-dimensional shape of the CF-profile is obtained. Subsequently the CF-profiles 10 are immediately removed from the mould and with the profile gripper 26 transferred into the LFT-tool 31 of the LFT-press 30 by the robot 42 and accurately positioned. With the profile gripper 26 the CF-profiles 10 during the transfer are aligned to the required set-point position in the air, i.e., with respect to translation motion, rotation and inclination into the defined position for each individual CF-profile. With a profile gripper 26, such as a robot, the profiles are able to be individually gripped and transferred or else also several profiles gripped at the same time and simultaneously respectively aligned to the correct position and then deposited together.

In the example of FIG. 8, first the profile 10.1 is positioned, and thereupon together the CF-profiles 10.2 and 10.3 are each respectively vertically positioned in a rib and then the CF-profile 10.4 is positioned in a crimp, wherein also these four profiles are capable of being simultaneously transferred and positioned with a multiple profile gripper 26.

In order to avoid the molten CF-tapes 5 remaining stuck to the band gripper 18 and to the pre-forming elements 19, the tapes are able to be unstuck by means of a brief contact with cold gripper surfaces, which do not stick. A double-gripper of this type 18a, 18b comprises, e.g., two insulating small gripper contacts 18a and two stronger, cold, non-sticking gripper contacts 18b.

In a CF-profile forming station 20, with more than one profile tool 21.1, 21.2 it is also possible to simultaneously press several CF-profiles 10.

FIG. 12 illustrates a complete installation 40 with several CF-profile production lines with CF-profile forming stations 20.1, 20.2, 20.3 as well as with an LFT-processing facility 34, e.g., an extruder, and with an LFT-gripper 37 for transferring the molten LFT-mass 6 with the required temperature into the LFT-press 30, for example into the LFT-tool 31. The installation comprises partial control systems for the individual sub-assembly groups: a control 25 of the CF-profile forming stations, a control 35 of the LFT-processing facility and an LFT-press control 36, which can be combined in the installation control system 45 including the control system for the transfer robot 42.

Figure 13:
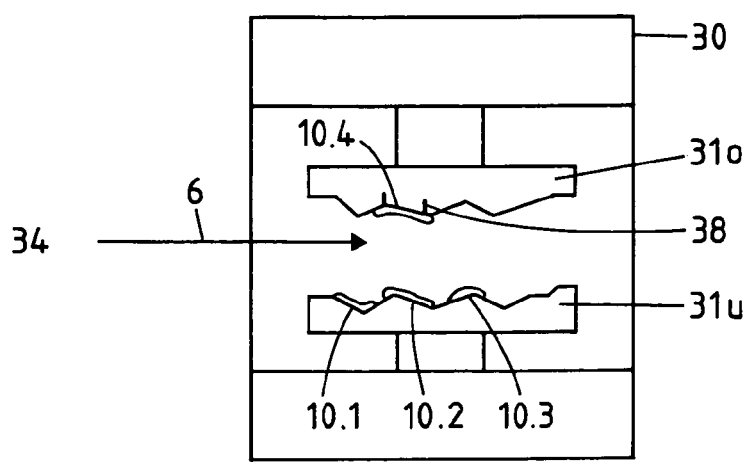

FIG. 13 illustrates the accurately defined positioning of several CF-profiles (10.1-10.4) in an LFT-tool in differing fitting positions and with any needed inclinations between flat and vertical. In this, the individual CF-profiles can be positioned on the lower tool 31u and/or also on the upper tool 31o and also be fixed with suitable fixing elements 38. With the LFT-mass 6 introduced in between therefore correspondingly also components with elaborate CF-profile reinforcement structures can be produced in a single step.

The LFT-mass 6 may also be introduced and pressed with other analogous compressive manufacturing processes instead of extruding. Thus it is also possible to utilise LFT-injection processes with horizontal pressing and a vertical LFT-tool. Applicable as particularly suitable is also an injection moulding process with back pressing in the source flow with a moving tool with submerged edges, where the tool during the injection is first slowly opened and then pressed together. It is also possible, however, to implement a horizontal pressing with a vertical LFT-tool. Vertical injection with a horizontal LFT-tool is also possible.

Structural components according to the invention contain one or more shock-cooled CF-profiles 10, which comprise a precisely defined shaping and a precisely defined position in the LFT-mass 6 and therefore also in the structural component, so that external loads to be carried are capable of being optimally carried and supported. The production according to the invention in the shock-cooling process is able to be proven on finished structural components, e.g., by distinguishing shaping marks on the CF-profiles, which have been created by the handling elements during the production process, by slight roundings of edges on the CF-profiles and by harmoniously balanced transitions between CF-profiles and LFT-mass.

In the case of the preferred crystalline thermoplastic materials, on the CF-profiles 10 in preference in the zone of a lower layer 13 (of, e.g., 0.2-0.4 mm thickness) below the profile surface 11 an increased crystallisation 101 is generated (refer to FIG. 7).

On the contact surfaces 9 between CF-profiles 10 and LFT-mass 6, in preference a directed crystallisation 102 over the contact surface is generated. This also results in improved mechanical properties and in an improved stability over time of the structural components with shock-cooled CF-profiles.

Light, load-bearing structural components according to the invention with integrated, shock-cooled CF-profiles are capable of being employed in a broad range of applications, e.g., in vehicle construction for components such as chassis parts, doors, seating structures, tailgates, etc. The structural components in some applications can also be constructed with solely one integrated, suitable shaped CF-profile. Two examples of structural components with one single CF-profile are illustrated in FIGS. 14 and 15.

Figure 14:
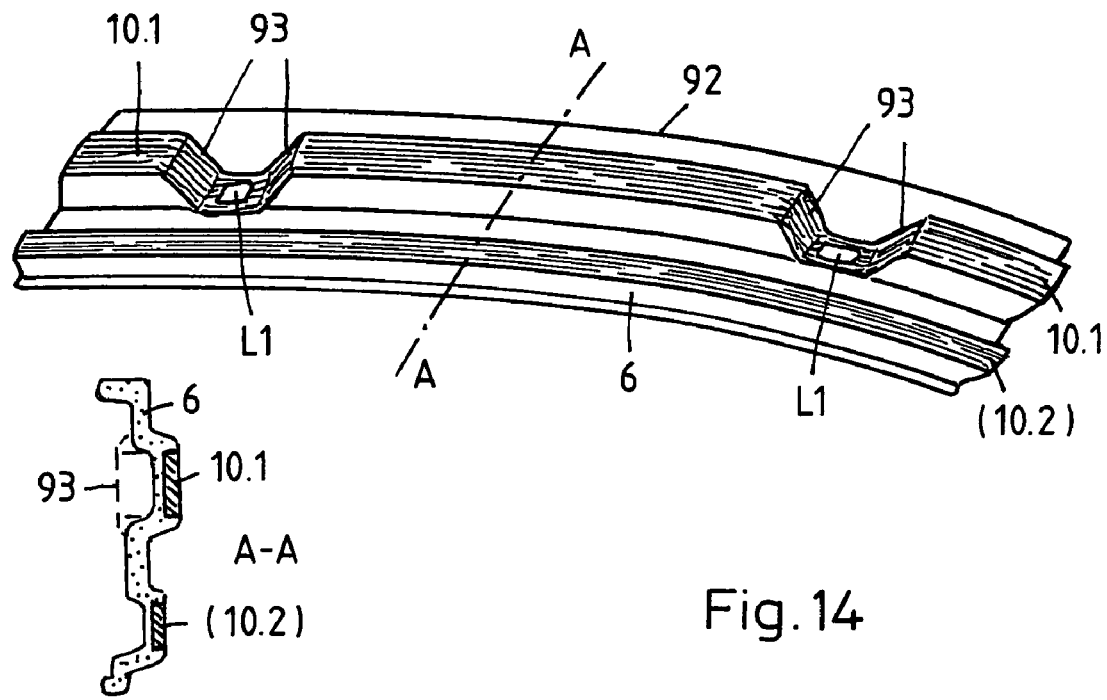

FIG. 14 illustrates a bumper beam support 92 with a CF-profile 10.1 integrated into the forming LFT-mass 6, which extends over the whole length. At two load receiving points L1, the bumper beam support 92 is connected with the vehicle chassis. The CF-profile 10.1 here is designed as "top-shaped", with slanting flanks 93 and integrated into the LFT-mass, as a result of which also an energy-absorbing crash-element is created. In another, reinforced variant, alternatively it would also be possible to integrate a second CF-profile 10.2 on a crimp underneath the CF-profile 10.1.

Figure 15:
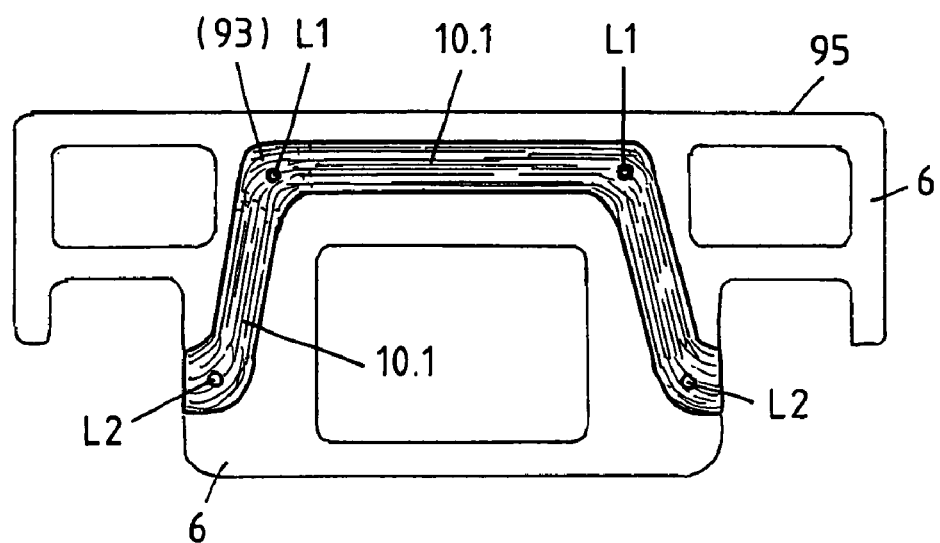

FIG. 15 illustrates an assembly support (front end) 95 with an integrated CF-profile 10.1 bent on both sides with four load receiving points L1, L2, where the assembly support is attached to the chassis. Depending on requirements, the CF-profile 10.1 may also comprise a shaping or recess at these points L1, L2, which, integrated into the LFT-mass as a crash-element 93 is plastically deformable—in analogy to the example of FIG. 14.

Within the scope of this description, the following designations are used:
 1—Structural component
 1.2—Second part (two-shell)
 4—Inserts, inlays
 5—CF-tapes, CF-bands
 6—LFT-mass, form mass
 7—Crimp
 8R—ib
 9—Interface, contact surface CF-LFT
 10 CF-profiles
 11—Profile surface
 12—Casing layer
 13—Lower layer (layer below 11)
 14—Semi-finished products store
 15—Heating station
 16—Chain conveyor
 17—Transfer portal
 18—Band gripper
 19—Pre-forming elements
 20—CF-profile forming station (shock cooling)
 21—Profile tool
 21$o$, 21$u$—Upper, lower
 22—CF-profile shapings
 23—Profile press
 25—Control of CF-profile forming station
 26—Profile gripper
 27—Protection gas atmosphere
 30—LFT-press
 31—LFT-tool
 31$o$, 31$u$—Upper, lower
 32—LFT-shapings
 34—LFT-processing, extruder
 35—LFT-control of 34
 36—LFT-press control
 37—LFT-gripper
 38—Fixing elements
 40—Installation
 42—Transfer robot, handling unit
 45—Installation control system
 50—Three-dimensional intersection point
 54—Positioning points
 55—Positioning shoulder
 56—Thick tensile—and compressive force zones in 10
 57—Thinner thrust zone
 58—Lock
 59$a,b$—Axle holders
 60—Belt roller, belt connection, belt lock
 61—Head supports
 88—Internal zone
 89—External zone
 92—Bumper beam support
 93—Crash element
 95—Assembly support, front end
 101—Enhanced crystallisation
 102—Directed crystallisation
 LFT—Long fiber thermoplastic
 CF—Continuous fiber
 ae—Heat penetration coefficient
 d—Direction vertical to the profile surface 11
 dp—Thickness of the profile
 df—Thickness of the LFT-layer
 Q1—Heat transfer at 21
 Q2—Heat transfer from 6
 t—Times, periods
 ts—Shock-cooling period
 tt—Transfer time
 T—Temperatures
 Ta—Surface temperature
 Ti—Temperature inside, internal temperature
 Twp-T of CF-profile tool 21
 Twl-T of LFT-tool 31
 Tf-T of LFT-mass
 Tm—Melting temperature
 Tp0-T of CF-tape 5
 Tp—Input temperature of CF-profile 10
 Tu—Lower solidification temperature
 T1, T2—Profile temperature curves
 DTkr—Crystallisation temperature range
 kr—Crystal growth
 DEn—Hysteresis range (crystallisation heat, latent enthalpy)
 L—Loads
 En—Enthalpy
 S1, S2, S3, S4—Process steps

What is claimed is:

1. A structural component with partially crystalline thermoplastic material and with at least one CF-profile integrated in an LFT-mass, which is produced in a single stage LFT-pressing manufacturing process, the method comprising the steps of:
melting impregnated CF-tapes in a heating station;
subsequently transferring the melted CF-tapes into a two-part profile tool of a CF-profile forming station;

within the CF-profile forming station, pressing the CF-tapes for a time period by means of heat transfer to the thermally conditioned profile tool, to yield a shock-cooled, solidified, dimentionally stable casing layer, an inner part of the CF-tapes remaining melted, and the CF-tapes defining a CF-profile;

after the pressing and shock cooling, separating the CF-profile from the profile tool;

after the separating, transferring the CF-profile into an LFT-tool and positioning the CF-profile in a defined manner;

after the positioning, introducing a molten LFT-mass into the LFT-tool;

pressing the LFT-mass together with the CF-profile;

so that during the pressing of the LFT-mass together with the CF-profile, the casing layer is melted again at the surface and is thermoplastically melted together with the surrounding LFT-mass and wherein the CF-profiles in a zone of a lower layer below the profile surface comprise an increased proportion of crystalline material.

2. The structural component of claim 1 wherein, at contact surfaces between CF-profiles and LFT-mass it comprises a crystallisation with a directed crystal growth through over the contact surface.

3. A method for the production of structural components out of long-fiber thermoplastic (LFT) with integrated continuous-fiber (CF) reinforcements in a single stage LFT-pressing manufacturing process, the method comprising the steps of:

melting impregnated CF-tapes in a heating station;

subsequently transferring the melted CF-tapes into a two-part profile tool of a CF-profile forming station;

within the CF-profile forming station, pressing the CF tapes for a time period by means of a heat transfer to the thermally conditioned profile tool, to yield a shock-cooled, solidified, dimensionally stable casing layer, an inner part of the CF tapes remaining melted, and the CF tapes defining a CF-profile;

after the pressing and shock cooling, separating the CF-profile from the profile tool;

after the separating, transferring the CF-profile into an LFT-tool and positioning the CF-profile in a defined manner;

after the positioning, introducing a molten LFT-mass into the LFT-tool;

pressing the LFT-mass together with the CF-profile;

so that during the pressing of the LFT-mass together with the CF-profile, the casing layer is melted again at the surface and is thermoplastically melted together with the surrounding LFT-mass.

4. The method of claim 3 wherein as the LFT-pressing manufacturing process, an LFT-extrusion process with a vertical LFT-press and a horizontal pressing tool is utilised.

5. The method of claim 3 wherein the LFT-pressing manufacturing process comprises an LFT-injection moulding process.

6. The method of claim 5 wherein the LFT-injection moulding process comprises a back pressing in the source flow.

7. The method of claim 3 wherein several CF-profiles are positioned in the LFT-tool and subsequently pressed together with the LFT-mass.

8. The method of claim 3 wherein CF-profiles are simultaneously produced in more than one CF-profile production line.

9. The method of claim 3 wherein in the profile tool, more than one CF-profile is produced.

10. The method of claim 3 wherein the CF-profile forming station comprises more than one profile tool, so that a plurality of CF-profiles are pressed simultaneously.

11. The method of claim 3 wherein in the CF-profile forming station, a multi-stage profile forming process is carried out by means of a multi-part profile tool.

12. The method of claim 3 wherein the melted CF-tapes are pre-formed in plastic condition by pre-forming elements during the transfer into the profile tool.

13. The method of claim 3 wherein the shaping of the CF-profile comprises a three-dimensional profile shaping.

14. The method of claim 3 wherein the CF-profile in longitudinal direction comprises a bend, a twist, a fold, or a surface structuring and wherein the CF-profile has differing cross-sectional shapes.

15. The method of claim 3 wherein the shock-cooling period has a duration in the range of from 1 to 5 sec.

16. The method of claim 3 wherein the LFT-mass comprises an average fiber length of at least 3 mm.

17. The method of claim 3 wherein the thermoplastic material consists of partially crystalline polymers.

18. The method of claim 3 wherein the thermoplastic material consists of polypropylene, polyethylene-therephthalate, polybutylene-therephthalate or polyamide, and the continuous fiber reinforcement consists of glass-, carbon- or aramide-fibers.

19. The method of claim 3 wherein the CF-profiles comprise a surface layer of 0.1 to 0.2 mm of pure thermoplastic material without CF-fiber reinforcement.

20. The method of claim 3 wherein the CF-profiles are built-up out of layers with differing fiber orientations.

21. The method of claim 3 wherein the CF-profiles comprise locally differing shock-cooling zones.

22. The method of claim 3 wherein a surface of the CF-profile adjacent to the LFT-tool has been shock-cooled to a larger extent on one side than on the opposite side.

23. The method of claim 17, wherein the surfaces of the CF-profiles following the shock-cooling are very rapidly brought back again to a temperature above DTkr from a temperature below the crystallisation temperature range DTkr.

24. The method of claim 17 wherein during the shock-cooling with a slower passage through a crystallisation temperature range DTkr, a corresponding crystalline proportion is generated in a lower layer.

25. The method of claim 3 wherein the CF-profiles are positioned in shapings of the LFT-tool in differing fitting positions.

26. The method of claim 3 wherein an IR-heating station with a protection gas atmosphere, a chain conveyor, a transfer robot with grippers for transferring of the CF-profiles and molten LFT-mass, an LFT-extruder, an LFT-press and an installation control system with partial controls for the different stations.

* * * * *